United States Patent
Florissi et al.

(10) Patent No.: US 9,147,063 B1
(45) Date of Patent: Sep. 29, 2015

(54) PASSCODE GENERATION UTILIZING SELECTED PERMUTATION TYPE APPLIED TO TOKENCODE AND PERSONAL IDENTIFIER

(71) Applicant: EMC Corporation, Hopkinton, MA (US)

(72) Inventors: Patricia Gomes Soares Florissi, Briarcliff Manor, NY (US); Daniel V. Bailey, Pepperell, MA (US)

(73) Assignee: EMC Corporation, Hopkinton, MA (US)

( * ) Notice: Subject to any disclaimer, the term of this patent is extended or adjusted under 35 U.S.C. 154(b) by 43 days.

(21) Appl. No.: 14/039,691

(22) Filed: Sep. 27, 2013

(51) Int. Cl.
*G06F 21/30* (2013.01)
*G06F 21/34* (2013.01)

(52) U.S. Cl.
CPC ...................... *G06F 21/34* (2013.01)

(58) Field of Classification Search
CPC ..... G06F 21/31; G06F 21/33; G06F 21/6245; G06F 2221/2115; G06F 21/35; G06F 21/34; G06F 21/32; G06F 21/43; G06F 21/00; H04L 2209/56; H04L 9/3226; H04L 9/00; H04L 9/32; H04L 63/0861; H04L 63/0838; H04L 9/3231; H04L 9/3215; H04L 9/3228
USPC ............ 726/6, 9, 16; 713/168, 172, 176, 185; 709/203
See application file for complete search history.

(56) References Cited

U.S. PATENT DOCUMENTS

| | | | | |
|---|---|---|---|---|
| 8,224,887 | B2 * | 7/2012 | Singerle, Jr. | 709/203 |
| 8,572,713 | B2 * | 10/2013 | Buer | 726/9 |
| 8,752,146 | B1 * | 6/2014 | van Dijk et al. | 726/6 |
| 8,752,153 | B2 * | 6/2014 | Vysogorets et al. | 726/9 |
| 2009/0282247 | A1 * | 11/2009 | Kirkup et al. | 713/168 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.
U.S. Appl. No. 13/628,757 filed in the name of T.N. Niranjan et al. on Sep. 27, 2012 and entitled "Cloud Service Level Attestation."

* cited by examiner

*Primary Examiner* — Thanhnga B Truong
(74) *Attorney, Agent, or Firm* — Ryan, Mason & Lewis, LLP

(57) ABSTRACT

A processing device is configured to receive a personal identifier from a user, to obtain a tokencode generated by an authentication token, to determine a permutation type for the user, and to generate a passcode utilizing the personal identifier, the tokencode and the permutation type. The personal identifier may comprise a personal identification number (PIN) or other arrangement of characters, and the permutation type may specify a particular ordering of characters of the personal identifier and the tokencode in the passcode. For example, if the passcode is normally generated by direct concatenation of the personal identifier and the tokencode, the permutation type may specify a deviation from direct concatenation of the personal identifier and the tokencode in generating the passcode, such as at least one of reversal, interleaving and reordering of the characters of the personal identifier and the tokencode in generating the passcode.

21 Claims, 3 Drawing Sheets

FIG. 4

| PASSCODE | 1 | 2 | 3 | 4 | 5 | 6 | 7 | 8 | 1 | 2 | 3 | 4 | 5 | 6 |
|---|---|---|---|---|---|---|---|---|---|---|---|---|---|---|
| INPUT POSITION | 1 | 2 | 3 | 4 | 5 | 6 | 7 | 8 | 9 | 10 | 11 | 12 | 13 | 14 |

FIG. 5

| INPUT POSITION | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| OUTPUT POSITION | 14 | 13 | 12 | 11 | 10 | 9 | 8 | 7 | 6 | 5 | 4 | 3 | 2 | 1 |

FIG. 6

| INPUT POSITION | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| OUTPUT POSITION | 1 | 9 | 2 | 10 | 3 | 11 | 4 | 12 | 5 | 13 | 6 | 14 | 7 | 8 |

FIG. 7

| INPUT POSITION | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| OUTPUT POSITION | 14 | 11 | 9 | 7 | 5 | 3 | 1 | 2 | 4 | 6 | 8 | 10 | 12 | 13 |

FIG. 8

| INPUT POSITION | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| OUTPUT POSITION | 13 | 12 | 11 | 10 | 9 | 8 | 7 | 6 | 5 | 4 | 3 | 2 | 1 | 14 |

PASSCODE GENERATION UTILIZING SELECTED PERMUTATION TYPE APPLIED TO TOKENCODE AND PERSONAL IDENTIFIER

FIELD

The field relates generally to authentication systems, and more particularly to authentication techniques implemented using hardware or software authentication tokens that generate tokencodes.

BACKGROUND

Hardware authentication tokens are typically implemented as small, hand-held devices that display a series of tokencodes over time. A user equipped with such a hardware authentication token reads the currently displayed tokencode and enters it into a mobile telephone, computer or other element of an authentication system as part of an authentication operation. It is also known to incorporate software authentication tokens in mobile telephones, computers or other user devices. The dynamic tokencodes provided by hardware or software authentication tokens offer a significant security improvement over authentication based on a static password.

Authentication tokens are typically programmed with a random seed or other type of secret key that is also stored in a token record file of the authentication system. The token record file is loaded into an authentication server, such that the server can create matching tokencodes for the authentication token based on the secret key and the current time or current event count. When the user first activates the token, the server stores a personal identification number (PIN) for the user in association with the secret key corresponding to the activated token.

Conventional authentication tokens include both time-synchronous and event-synchronous tokens.

In a typical time-synchronous token, the displayed tokencodes are based on the secret key and the time of day. An authentication server with access to the secret key and a time of day clock can verify that a given presented tokencode is valid.

One particular example of a time-synchronous authentication token is the RSA SecurID® user authentication token, commercially available from RSA, The Security Division of EMC Corporation, of Bedford, Mass., U.S.A.

Event-synchronous tokens generate tokencodes in response to a designated event, such as a user pressing a button on the token. Each time the button is pressed, a new tokencode is generated based on the secret key and an event counter. An authentication server with access to the secret key and the current event count can verify that a given presented tokencode is valid.

Other known types of authentication tokens include hybrid time-synchronous and event-synchronous tokens.

Many authentication systems are configured to require that a user enter the PIN in addition to entering the tokencode from the authentication token. This provides an additional security factor, based on something the user knows, thereby protecting against unauthorized use of an authentication token that is lost or stolen. Such an arrangement is generally referred to as two-factor authentication, in that authentication is based on something the user has (e.g., the authentication token) as well as something the user knows (e.g., the PIN).

By way of example, in order to gain access to a protected resource, the user typically enters the PIN and then enters the tokencode that appears on his or her authentication token. The protected resource receives this information and passes it on to the authentication server, which will then check if this information matches the information it has for the user in its token record file.

In conventional practice, the PIN is often directly concatenated with the tokencode to generate what is more generally referred to herein as a "passcode." The passcode is provided to the authentication server which verifies the user based on the PIN and tokencode that make up the passcode.

SUMMARY

A drawback of the conventional practice described above is that an attacker that intercepts or otherwise obtains a single passcode generated as a direct concatenation of a PIN and a tokencode will immediately learn the value of the PIN. Unlike the tokencode, the PIN typically does not change on a frequent basis. For example, the authentication system may be configured to require that a user change his or her PIN only once every few months. Because the PIN changes far less often than the tokencode, learning the PIN from a single passcode helps the attacker in future attacks, in that the attacker merely needs to guess the value of the tokencode to access the protected resource.

Illustrative embodiments of the present invention address this drawback of conventional practice by providing arrangements in which, for example, a user can select a secret permutation type to be applied in generating a passcode from a PIN and a tokencode, as a deviation from direct concatenation as described above. This defensive measure increases the number of passcodes an attacker must intercept before determining the value of the PIN. Moreover, the permutation type itself can change over time in accordance with a specified permutation update function, thereby providing additional protection.

In one embodiment, a processing device is configured to receive a personal identifier from a user, to obtain a tokencode generated by an authentication token, to determine a permutation type for the user, and to generate a passcode utilizing the personal identifier, the tokencode and the permutation type. The personal identifier may comprise a PIN or other arrangement of characters, and the permutation type may specify a particular ordering of characters of the personal identifier and the tokencode in the passcode. For example, if the passcode is normally generated by direct concatenation of the personal identifier and the tokencode, the permutation type may specify a deviation from direct concatenation of the personal identifier and the tokencode in generating the passcode, such as at least one of reversal, interleaving and reordering of the characters of the personal identifier and the tokencode in generating the passcode.

The illustrative embodiments provide improved security for passcode authentication, without requiring any significant or costly changes to user devices, authentication tokens, authentication servers or authentication protocols.

BRIEF DESCRIPTION OF THE DRAWINGS

FIG. 4 shows input positions for a passcode generated by direct concatenation of a PIN and a tokencode in one embodiment.

FIGS. 5, 6 and 7 show passcodes generated by applying different permutation types to the input positions shown in FIG. 4.

FIG. 8 shows a passcode generated using a cyclic shift of the permutation type illustrated in FIG. 5.

DETAILED DESCRIPTION

Illustrative embodiments of the present invention will be described herein with reference to exemplary authentication systems and associated user devices, authentication servers and other processing devices. It is to be appreciated, however, that the invention is not restricted to use with the particular illustrative system and device configurations shown. Accordingly, the term "authentication system" as used herein is intended to be broadly construed, so as to encompass any type of system in which passcodes incorporating personal identifiers and tokencodes are utilized for user verification.

Figure 1:
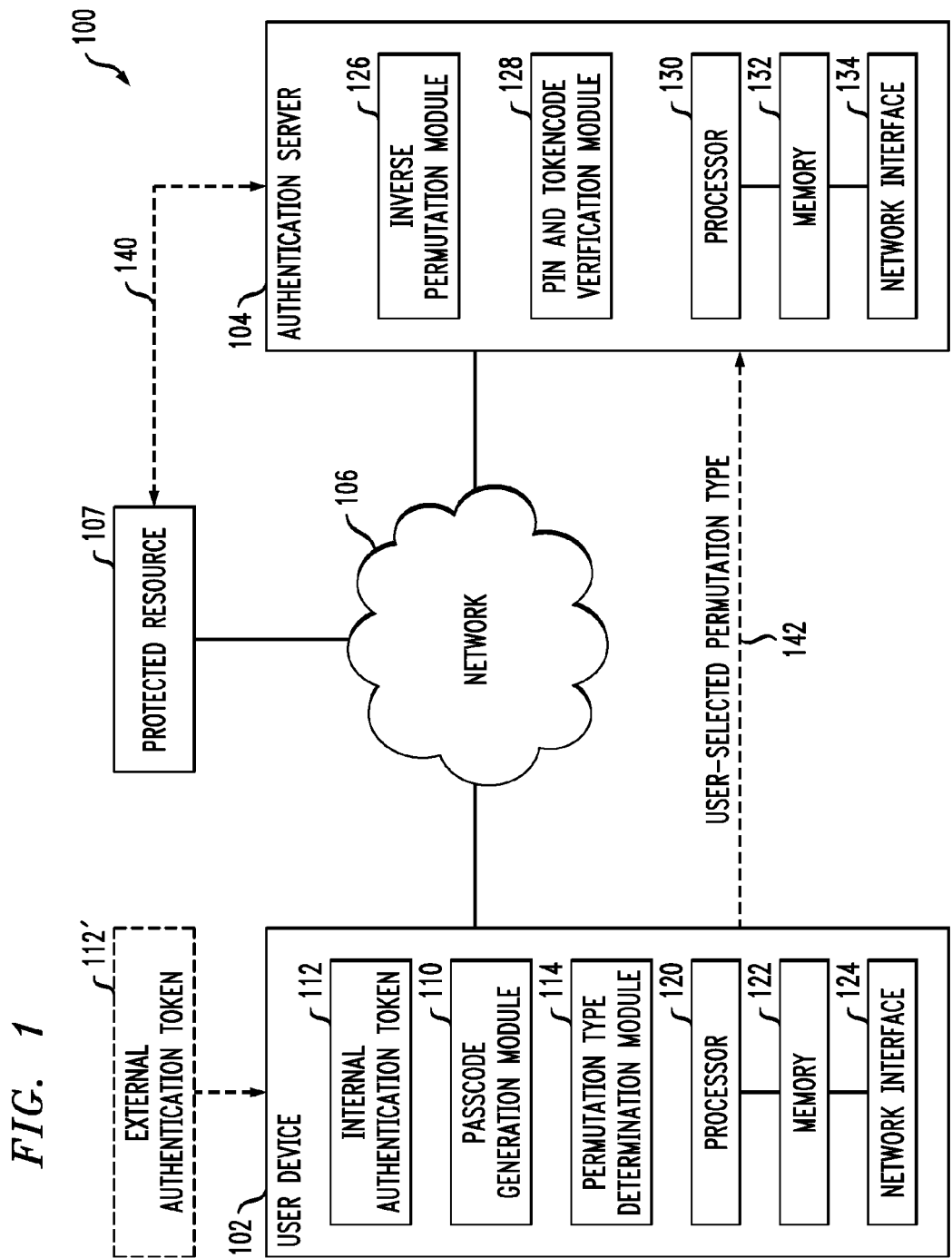
FIG. 1 is a block diagram of an authentication system with passcode generation and verification functionality in an illustrative embodiment of the invention.

FIG. 1 shows authentication system 100 implementing passcode generation and verification functionality in an illustrative embodiment. The authentication system comprises a user device 102 that communicates with an authentication server 104 over a network 106 in order to obtain access to a protected resource 107.

The user device 102 may comprise, for example, a mobile telephone, a laptop or tablet computer, a desktop computer, a gaming console or another type of user device as well as various combinations of multiple distinct devices. Each such device may be associated with a corresponding user that authenticates to the authentication server 104 in order to obtain access to the protected resource 107, where "user" as the term is applied herein should be generally construed so as to encompass, for example, a human user or an associated hardware or software entity. Numerous alternative arrangements are possible.

The authentication server 104 may comprise any type of processing device or set of such devices that is operative to authenticate a passcode generated by the user device 102. It need not be a network-based server, and may be implemented as a portion of a device that performs other functions, as a combination of multiple servers or other devices, or in other forms.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

The protected resource 107 may comprise, for example, a multi-user computer system, a web site, an application, etc. A given such protected resource may reside at least in part on the user device 102 rather than being separate from that device as illustrated in the figure.

The user device 102 comprises a passcode generation module 110, an internal authentication token 112 and a permutation type determination module 114.

The passcode generation module 110 is configured to receive a PIN or other personal identifier from a user associated with user device 102, to obtain a tokencode generated by the internal authentication token 112, and to receive a permutation type from the permutation type determination module 114 as determined for the user. The passcode generation module 110 then generates a passcode utilizing the personal identifier, the tokencode and the permutation type. The permutation type may be specified by the user prior to or in conjunction with an authentication attempt as will be described in greater detail below.

Instead of or in addition to utilizing tokencodes provided by internal authentication token 112, the user device 102 may utilize tokencodes provided by external authentication token 112'. The authentication tokens 112 and 112' may be implemented as respective software and hardware authentication tokens. For example, internal authentication token 112 may be implemented as a time-synchronous software token running on processing hardware within the user device 102, and external authentication token 112' may comprise a time-synchronous hardware token such as the above-noted RSA SecurID® that is implemented as a separate hardware device relative to the user device 102.

A time-synchronous hardware or software token of this type typically generates tokencodes in the form of sets of digits, such as sets of six digits. Each of the tokencodes in a given series of tokencodes is valid only for a particular period of time, such as a minute. Accordingly, the tokencode output of the authentication token in this case is updated approximately once every minute. These update time periods are also referred to as "epochs."

Other types of authentication tokens can be used, including an event-synchronous authentication token, a challenge-response token, a hash-chain token, or a hybrid token that incorporates multiple such capabilities, such as a hybrid time-synchronous and event-synchronous token.

The external authentication token 112' may present tokencodes to a user via a display of the token, such that the user can manually enter the tokencodes into the user device 102. Alternatively, a given tokencode may be communicated directly from the external authentication token to the user device 102 via a wired or wireless connection between the token and the user device. By way of example, the external authentication token may be configured to communicate with the user device 102 via a wired connection such as a USB interface, or via a wireless connection such as a Bluetooth or IEEE 802.11 connection.

The internal authentication token 112 may also present tokencodes on a display for manual entry by a user, or may automatically communicate those tokencodes to the appropriate module(s) on the user device 102.

A given authentication token may be a connected token or a disconnected token, or one capable of operating in both connected and disconnected modes.

Although two authentication tokens are shown in FIG. 1, only a single authentication token is needed in a given embodiment, and it may be implemented as a hardware or software authentication token. Some implementations may include only internal token 112, and others may include only external token 112'. Accordingly, the token 112' is illustratively shown in dashed outline in the figure.

Figure 2:
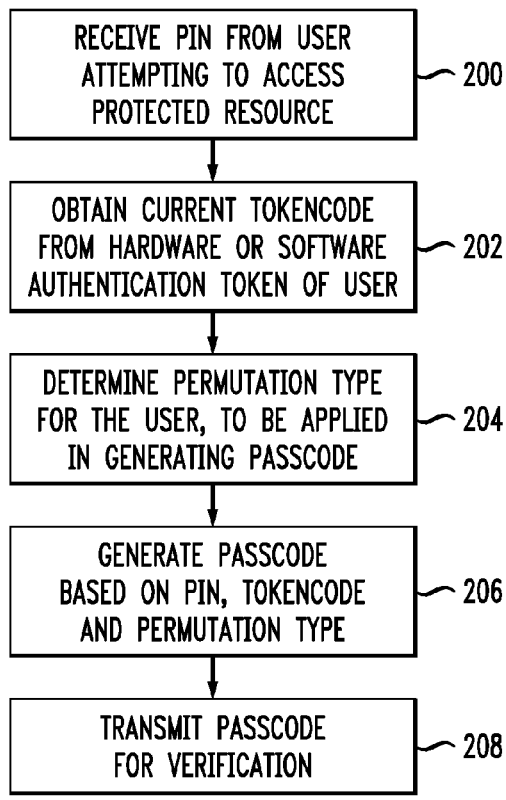
FIG. 2 is a flow diagram of a process for generating a passcode in an illustrative embodiment.

The operation of the user device 102 in generating a passcode in the authentication system 100 is illustrated in more detail in the flow diagram of FIG. 2. In this embodiment, an exemplary passcode generation process performed by user device 102 includes steps 200 through 208. It is assumed without limitation that the personal identifier comprises a PIN, although other types of personal identifiers can be used.

In step 200, a PIN is received from a user attempting to access protected resource 107.

In step 202, a current tokencode is obtained by the user device 102, either from internal authentication token 112 or external authentication token 112'.

In step 204, a determination is made in module 114 regarding the permutation type for the user, to be applied in generating the passcode.

By way of example, the permutation type may comprise a particular ordering of characters of the PIN and the tokencode in the passcode. Accordingly, if the passcode would normally be generated by direct concatenation of the PIN and the tokencode, the permutation type may specify a deviation from direct concatenation of the PIN and the tokencode in generating the passcode, such as at least one of reversal, interleaving and reordering of the characters of the PIN and the tokencode in generating the passcode.

The term "permutation" as used herein is intended to be broadly construed, so as to encompass, for example, a wide variety of different types of reversals, interleavings, reorderings or other variations in the manner in which characters of a PIN or other personal identifier are combined with characters of a tokencode to form a passcode, other than conventional direct concatenation of the PIN and the tokencode. More detailed examples of permutation types will be described below in conjunction with FIGS. 4 through 8.

The term "passcode" as used herein is also intended to be broadly construed and should be understood to encompass any arrangement of words, phrases, numbers or other combinations of characters collectively comprising a personal identifier and a tokencode for user verification.

In step 206, the module 110 generates the passcode based on the PIN, current tokencode and the permutation type.

In step 208, the passcode is transmitted by the user device 102 to the authentication server 104 over the network 106. Alternatively, the user device 102 may provide the passcode to the protected resource 107 which in turn sends the passcode to the authentication server 104 for verification.

Referring again to FIG. 1, the authentication server 104 comprises an inverse permutation module 126 and a PIN and tokencode verification module 128. The inverse permutation module 126 receives the passcode that was generated in user device 102 utilizing a user-specified permutation type, and inverts the permutation to obtain a conventional passcode, possibly comprising a direct concatenation of the PIN and the tokencode. The verification module 128 then proceeds to verify the user based on the submitted PIN and tokencode in the manner described elsewhere herein.

Figure 3:
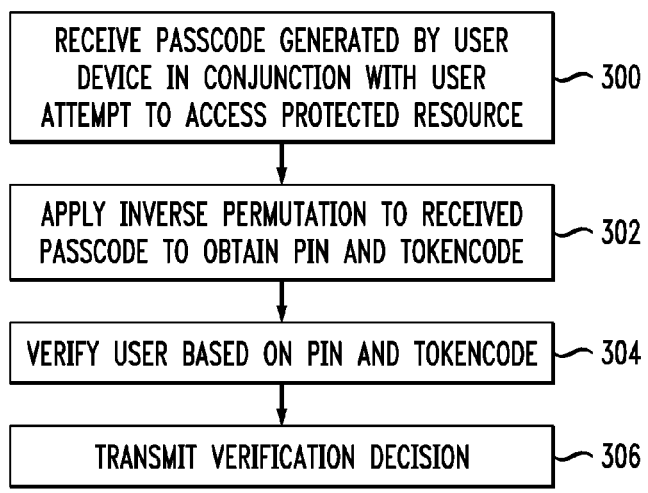
FIG. 3 is a flow diagram of a process for verifying a passcode generated in the manner illustrated in FIG. 2.

The operation of the authentication server 104 in verifying a passcode in the authentication system 100 is illustrated in more detail in the flow diagram of FIG. 3. In this embodiment, an exemplary passcode verification process performed by authentication server 104 includes steps 300 through 306. Again, it is assumed without limitation that the personal identifier comprises a PIN, although other types of personal identifiers can be used.

In step 300, a passcode generated by the user device 102 is received by the authentication server 104 in conjunction with a user attempt to access protected resource 107. As indicated above, the passcode may be received from the user device 102 over network 106 or from the protected resource 107 itself.

In step 302, the module 126 applies an appropriate inverse permutation to the received passcode in order to obtain the PIN and tokencode.

In step 304, the module 128 verifies the PIN and tokencode using the secret key stored in association with the PIN registered for the corresponding token in the record file of the authentication server.

In step 306, the authentication server transmits the verification decision. For example, the decision may be transmitted back to the user device 102 or to the protected resource 107 that the user is attempting to access.

The particular processing operations and other system functionality described in conjunction with the flow diagrams of FIGS. 2 and 3 are presented by way of illustrative example only, and should not be construed as limiting the scope of the invention in any way. Alternative embodiments can use other types of processing operations for generating and verifying passcodes as disclosed herein. For example, the ordering of the process steps may be varied in other embodiments, or certain steps may be performed concurrently with one another rather than serially. Also, the process steps may be repeated periodically in conjunction with respective distinct authentication attempts.

The user device 102 and authentication server 104 in the FIG. 1 embodiment are implemented as respective processing devices. Each such processing device generally comprises at least one processor and an associated memory, and implements one or more functional modules for controlling certain features of the system 100.

Referring again to FIG. 1, the user device 102 comprises a processor 120 coupled to a memory 122 and a network interface 124.

The processor 120 may comprise a microprocessor, a microcontroller, an application-specific integrated circuit (ASIC), a field-programmable gate array (FPGA) or other type of processing circuitry, as well as portions or combinations of such circuitry elements.

The memory 122 may comprise random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

The network interface 124 allows the user device 102 to communicate over the network 106 with the authentication server 104 and protected resource 107, and may comprise one or more conventional transceivers.

One or more of passcode generation module 110, internal authentication token 112 and permutation type determination module 114 of the user device 102 may be implemented at least in part in the form of software that is stored in memory 122 and executed by processor 120.

Like the user device 102, the authentication server 104 comprises a processor 130 coupled to a memory 132 and a network interface 134.

The processor 130, like processor 120 in user device 102, may similarly comprise a microprocessor, a microcontroller, an ASIC, an FPGA or other type of processing circuitry, as well as portions or combinations of such circuitry elements.

The 132, like memory 122 in user device 102, may similarly comprise RAM, ROM or other types of memory, in any combination.

The network interface 134 allows the authentication server 104 to communicate over the network 106 with the user device 102 and the protected resource 107 and may comprise one or more conventional transceivers.

The above-noted network interfaces 124 and 134 may also be used to support various types of communication utilizing out-of-band channels.

For example, an out-of-band channel 140 not involving communication over network 106 may be utilized by the authentication server 104 to communicate with the protected resource 107. As another example, an out-of-band channel 142 not involving communication over network 106 may be utilized by the user device 102 to provide an indication of a user-selected permutation type to the authentication server 104. These exemplary out-of-band channels 140 and 142 are shown in dashed outline in the figure. The term "out-of-band channel" in this context is intended to be broadly construed so as to encompass a different network connection than that typically used for communication between two or more of user device 102, authentication server 104 and protected resource 107.

Alternatively, communications over network 106 may be used in place of one or both of the exemplary out-of-band channels 140 and 142.

Therefore, although illustratively shown as being separate from network 106, out-of-band channels 140 and 142 may instead pass through different portions of network 106, or otherwise be configured in an out-of-band manner relative to one or more other communication links between two or more of system elements 102, 104 and 107. Examples of out-of-band channels that may be utilized in embodiments of the present invention include text messaging channels, email channels, telephony channels, etc.

One or more of inverse permutation module 126 and PIN and tokencode verification module 128 of the authentication server 104 may be implemented at least in part in the form of software that is stored in memory 132 and executed by processor 130.

It is to be appreciated that the particular set of elements shown in FIG. 1 for providing permuted passcode generation and verification is presented by way of example, and in other embodiments additional or alternative elements may be used. Thus, another embodiment may include additional networks and additional sets of user devices, authentication servers or protected resources.

Also, a variety of different authentication processes may be used in embodiments of the invention. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

As mentioned previously, various elements of system 100 such as modules associated with user device 102 and authentication server 104 may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices.

Such processing platforms may include cloud infrastructure comprising virtual machines (VMs) and one or more associated hypervisors. An example of a commercially available hypervisor platform that may be used to implement portions of the system 100 is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

Examples of various types of permuted passcodes that may be generated by module 110 of the user device 102 will now be described in more detail with reference to FIGS. 4 through 8.

Referring initially to FIG. 4, it is assumed for these embodiments that the PIN comprises a sequence of 8 characters, and the tokencode comprises a sequence of 6 characters. Such an arrangement is consistent with the use of the above-noted RSA SecurID® authentication token, although as indicated previously, other types of tokens, and thus personal identifier and tokencode formats, may be used. Direct concatenation of the PIN and the tokencode results in the passcode shown in FIG. 4, where the passcode has input positions 1 through 14, with input positions 1 through 8 corresponding to the 8 characters of the PIN, and input positions 9 through 14 corresponding to the 6 characters of the tokencode. The resulting passcode in this example has the value 12345678123456.

It is assumed without limitation that the characters of the PIN and the characters of the tokencode in these embodiments are drawn from the same character set. Thus, for example, if the tokencode comprises alphanumeric characters, then the PIN also comprises alphanumeric characters.

It is further assumed that the authentication system 100 is configured to permit a user to select a secret permutation type to be used in place of the direct concatenation of the PIN and tokencode that is illustrated in FIG. 4. As a result, a user can specify not just the PIN but also the placement of the characters of the PIN within the characters of the passcode. Use of such a permutation type advantageously increases the number of passcodes an attacker must intercept before determining the value of the PIN. Moreover, the permutation type itself may be permitted to change over time, thereby providing additional protection.

In the present set of examples using a PIN of 8 characters and a tokencode of 6 characters, there are 14 characters in the passcode, and 87,178,291,200 different permutations of these 14 characters are possible. If the user randomly selects a permutation type, the number of additional bits of entropy introduced by the permutation is given by $\log_2$ (87,178,291, 200)≈36. That is, if the user is randomly selecting a permutation type, this selection provides approximately 36 additional bits of entropy relative to that provided by direct concatenation of the PIN and tokencode.

Accordingly, the system 100 is configured to allow the user to select from multiple available permutation types. Each of the examples shown in respective FIGS. 5, 6 and 7 illustrates a different permutation type providing a particular ordering of characters of the PIN and the tokencode in the passcode. Each of these permutation types may be viewed as a deviation from the direct concatenation of the PIN and the tokencode illustrated in FIG. 4. More particularly, the permutation type indicates a specified mapping between input positions of respective ones of the characters of the concatenated PIN and tokencode and output positions of respective ones of those characters in the permuted passcode.

Referring now to FIG. 5, a passcode having input positions 1 through 14 corresponding to direct concatenation of the PIN and tokencode after application of a selected permutation type has its characters reversed. Thus, the character in input position 1 becomes the character in output position 14, the character in input position 2 becomes the character in output position 13, and so on through the rest of the positions.

In the FIG. 6 example, the permuted passcode has characters of the PIN interleaved with characters of the tokencode.

In the FIG. 7 example, the selected permutation type includes both reversal and interleaving of the characters of the PIN and tokencode.

Numerous other types of permutations may be used, possibly involving one or more of reversal, interleaving and reordering of the characters of the PIN and the tokencode in generating the passcode. More generally, a user can be permitted to map input positions to output positions using any one-to-one correspondence.

The user may specify his or her selected permutation type by interaction with a user interface of the user device 102. This may comprise, for example, a gesture interface, an audio interface or another type of interface.

By way of example, a gesture interface of the user device 102 may be configured to allow a user to specify the permutation type by tracing a path through a plurality of displayed elements corresponding to input positions of respective ones of the characters of the PIN and the tokencode, with the traced path indicating corresponding output positions of respective ones of those characters in the passcode.

In some arrangements of this type, a touchscreen display on the user device 102 may be used to capture gesture input from a user. For example, the display may present 14 dots, each corresponding to an input position. Using a finger, the user traces a path on the touchscreen that intersects each dot. The order in which the dots are encountered in the path is the output position order for the corresponding permutation type. In the case of the example of FIG. 5 in which the characters are reversed, the user would trace a path through the dots in reverse order to select this particular permutation type.

This process can be aided using mnemonic devices. For example, the user may be permitted to select a background image, and can trace a path through features of the image corresponding to overlaid dots. The path traced by the user could correspond to the ages of siblings shown in the image, or to other sets of features that will facilitate user recollection of his or her selected permutation type.

Such embodiments are not limited for use with touchscreen displays. For example, a gesture interface could capture user gestures using one or more cameras.

As another example, the user may specify the permutation type at least in part by providing audible input to an audio interface of the user device 102. More particularly, the user could hum particular musical notes in serial fashion. An entire musical genre based on serialism using 12 tones was popularized by composer Arnold Schoenberg, giving rise to many concerti, operas, and symphonies. As a mnemonic device, users could draw musical phrases from any of these works, or from any audible sequence consisting of a number of distinct pitches equal to the number of passcode characters.

Numerous other selection mechanisms may be used to allow a user to specify a permutation type to be applied in generating permuted passcodes as disclosed herein. With reference to the examples of FIGS. 4 through 7, any input data capture mechanism suitable for capturing 14 distinct position values in a particular order may be used to permute the input positions so as to produce a permuted passcode having output positions in which its characters are arranged in the particular order.

In some embodiments, the permutation type may be updated at designated intervals in accordance with a specified permutation update function. Parameters such as the particular permutation update function used and the duration of one or more of the designated intervals may be specified by the user. Permutation update arrangements of this type can provide further resilience against interception of passcodes by an attacker.

FIG. 8 shows an example of application of a permutation update function to the character reversal permutation type of FIG. 5. In this example, the permutation update function applies a cyclic shift to output positions of respective ones of the characters in the passcode. Thus, output position 14 in FIG. 5 becomes output position 13 in FIG. 8, output position 1 in FIG. 5 becomes output position 14 in FIG. 8, and so on. Of course, this cyclic shift is merely an example and the user is free to select any transformation.

Such a transformation may be viewed as taking a given ordering of output positions and transforming it to a new ordering of output positions. The update can occur at predetermined intervals, so the permutation update function may additionally take as inputs information such as the time of day, counter value, or other indications.

The user can select the permutation update function using any of the techniques outlined above for selection of a permutation type. For example, assume that the user selects a permutation type using gesture input by tracing a path through displayed dots. Further assume that the user knows the path to be traced to provide the desired permutation type. At predetermined intervals, such as daily at a particular time, the user could vary the starting point of the path to be traced. In effect, this would provide a cyclic shift in the ordering of the output positions of the permuted passcode.

It should be noted that in some embodiments there is a tradeoff between the number of permutation types permitted in a given embodiment and the difficulty that a user may have remembering his or her selected permutation type. However, visualization mechanisms may be implemented in the user device 102 in order to facilitate user recall of permutation type selection criteria.

It is to be appreciated that permuted passcode generation and verification functionality such as that described in conjunction with FIGS. 1-8 can be implemented at least in part in the form of one or more software programs stored in memory and executed by a processor of a processing device such as a computer or server. As mentioned previously, a memory or other storage device having such program code embodied therein is an example of what is more generally referred to herein as a "processor-readable storage medium."

The embodiments described in conjunction with FIGS. 1-8 can provide a number of significant advantages relative to conventional practice. For example, these embodiments provide authentication techniques that exhibit enhanced security relative to conventional passcode authentication, and can be readily deployed at low cost using existing authentication tokens and other infrastructure.

It should again be emphasized that the above-described embodiments of the invention are presented for purposes of illustration only. Many variations and other alternative embodiments may be used. For example, the techniques are applicable to a wide variety of other types of authentication systems and processing devices that can benefit from enhanced passcode security. Also, the particular configuration of system and device elements shown in FIG. 1, and the associated permuted passcode generation and verification processes described in conjunction with FIGS. 2 through 8, can be varied in other embodiments. In addition, the particular passcode formats and permutation types used may be varied to meet the needs of various implementations. These and numerous other alternative embodiments within the scope of the appended claims will be readily apparent to those skilled in the art.

What is claimed is:

1. A method comprising:
receiving a personal identifier from a user;
obtaining a tokencode generated by an authentication token;
determining a permutation type for the user; and
generating a passcode utilizing the personal identifier, the tokencode and the permutation type;
wherein the receiving, obtaining, determining and generating are performed at least in part by a processing device comprising a processor coupled to a memory; and
wherein the permutation type indicates a specified mapping between input positions of respective ones of a plurality of characters of the personal identifier and the tokencode and output positions of respective ones of those characters in the passcode.

2. The method of claim 1 wherein the permutation type is specified by the user.

3. The method of claim 1 wherein the personal identifier comprises a PIN.

4. The method of claim 1 wherein the permutation type specifies a particular ordering of the plurality of characters of the personal identifier and the tokencode in the passcode.

5. The method of claim 1 wherein the passcode is normally generated by direct concatenation of the personal identifier and the tokencode and the permutation type specifies a deviation from said direct concatenation of the personal identifier and the tokencode in generating the passcode.

6. The method of claim 1 further comprising outputting the passcode from the processing device.

7. The method of claim 2 wherein the user specifies the permutation type at least in part by interaction with a gesture interface of the processing device.

8. The method of claim 7 wherein the gesture interface is configured to allow a user to specify the permutation type by tracing a path through a plurality of displayed elements corresponding to input positions of respective ones of the plurality of characters of the personal identifier and the tokencode, with the traced path indicating corresponding output positions of respective ones of those characters in the passcode.

9. The method of claim 2 wherein the user specifies the permutation type at least in part by providing audible input to an audio interface of the processing device.

10. The method of claim 1 further comprising updating the permutation type at designated intervals in accordance with a specified permutation update function.

11. The method of claim 10 wherein at least one of the permutation update function and duration of one or more of the designated intervals is specified by the user.

12. The method of claim 1 further comprising providing information characterizing the permutation type to an authentication server.

13. The method of claim 12 wherein providing information characterizing the permutation type comprises providing said information from the processing device to the authentication server via an out-of-band channel.

14. The method of claim 1 wherein the authentication token comprises one of a hardware authentication token and a software authentication token.

15. A method comprising:
receiving a personal identifier from a user;
obtaining a tokencode generated by an authentication token;
determining a permutation type for the user; and
generating a passcode utilizing the personal identifier, the tokencode and the permutation type;
wherein the receiving, obtaining, determining and generating are performed at least in part by a processing device comprising a processor coupled to a memory; and
wherein the permutation type indicates at least one of reversal, interleaving and reordering of a plurality of characters of the personal identifier and the tokencode in generating the passcode.

16. A method comprising:
receiving a personal identifier from a user;
obtaining a tokencode generated by an authentication token;
determining a permutation type for the user; and
generating a passcode utilizing the personal identifier, the tokencode and the permutation type;
updating the permutation type at designated intervals in accordance with a specified permutation update function;
wherein the receiving, obtaining, determining, generating and updating are performed at least in part by a processing device comprising a processor coupled to a memory; and
wherein the permutation update function applies a cyclic shift to output positions of respective ones of a plurality of characters in the passcode.

17. An article of manufacture comprising a non-transitory computer-readable storage medium having embodied therein one or more software programs, wherein the one or more software programs when executed by at least one processing device cause the at least one processing device: to receive a personal identifier from a user; to obtain a tokencode generated by an authentication token; to determine a permutation type for the user; and to generate a passcode utilizing the personal identifier, the tokencode and the permutation type; wherein the permutation type indicates a specified mapping between input positions of respective ones of a plurality of characters of the personal identifier and the tokencode and output positions of respective ones of those characters in the passcode.

18. An apparatus comprising:
a processing device comprising a processor coupled to a memory;
wherein the processing device is configured to receive a personal identifier from a user, to obtain a tokencode generated by an authentication token, to determine a permutation type for the user, and to generate a passcode utilizing the personal identifier, the tokencode and the permutation type; and
wherein the permutation type indicates a specified mapping between input positions of respective ones of a plurality of characters of the personal identifier and the tokencode and output positions of respective ones of those characters in the passcode.

19. The apparatus of claim 18 wherein the processing device comprises one of a mobile telephone and a computer.

20. The apparatus of claim 18 wherein the authentication token comprises one of a hardware authentication token and a software authentication token.

21. The apparatus of claim 18 wherein the processing device is further configured to update the permutation type at designated intervals in accordance with a specified permutation update function, the permutation update function applying a cyclic shift to output positions of respective ones of the plurality of characters in the passcode.

* * * * *